Patented Sept. 29, 1942

2,297,417

UNITED STATES PATENT OFFICE 2,297,417

LAMINATED PRODUCT

Adolf Kämpfer, Berlin, Germany; vested in the Alien Property Custodian

No Drawing. Application October 21, 1939, Serial No. 300,657. In Germany April 12, 1935

2 Claims. (Cl. 49—81)

The invention of my present application which is a continuation in part of my former application Serial No. 42,357, filed September 26, 1935, relates to an improved laminated glass and the like, containing an intermediate sheet of a highly polymerized acrylic acid ester or vinyl acetate, as hereinafter defined, and more particularly to a means of producing adhesion between such intermediate sheet and the other parts of the laminated structure.

According to the present invention I use for this purpose an adhesive which consists of a solvent of high boiling point, i. e. at least 100° C., and preferably a polymerization product of vinyl acetate or an acrylic acid ester of the same basic material as the intermediate sheet but of low or medium viscosity which is compatible with the material of the intermediate layer. The adhesive contains no solvent having a lower boiling point than that above mentioned. The proportion of solvent of high boiling point is from 35 to 75 per cent of the whole.

In putting the structure together I preferably apply this adhesive freely to both sides of the intermediate sheet, e. g. by immersing the latter in the adhesive mixture, though it may alternatively or also be applied to the surface of the glass.

The assembly of the component parts is then performed at a temperature of between 60° and 90° C. under pressure, the adhesive being so composed as to be of syrupy consistency and also acting as a slip means i. e. the excess forced out under pressure serves to entrain and remove any air bubbles which may be present.

An adhesive of the character above-mentioned has been found to be highly suitable for cementing highly polymerised intermediate sheets i. e. layers in which polymerisation product of an acrylic acid ester or vinyl acetate has been carried approximately to the final stage, and which owing to the entire absence of solvents possess no powers of adhesion in themselves.

Attempts have been made to cement such highly polymerised intermediate layers to glass by means of adhesives containing a solvent of high boiling point and a solvent of low boiling point. Such adhesives can, however, be employed very thinly, and even then the low boiling point solvent has a tendency to diffuse into the intermediate layer and later to cause bubbles and fog. It has also been found that the joint formed by such thin layers does not possess sufficient elasticity, as the highly polymerised intermediate layers are extremely viscous in themselves and accordingly do not yield to any great extent, whereas the adhesive employed according to my present invention may be employed in considerable thickness to form a yielding connection between the rigid sheet of glass and the highly viscous intermediate layer.

If the known adhesives where employed for this purpose, together with a fatty liquid as slip means, it would be found that this fatty liquid would considerably reduce the cementing power of the adhesive and the capacity of the joint to hold splintered fragments. Owing to the high viscosity of an intermediate layer consisting of a highly molecular polymerisation product, the fatty slip means heretofore proposed, would be unable to diffuse into the intermediate layer, but would be compelled, so far as it is not again forced out, to mix with adhesive which would reduce the effectiveness of the adhesive.

A composite solvent may have a high boiling point per se but may also be incapable for use according to my present invention if it is a composite solvent like diacetone alcohol which at a temperature of 80° to 100° C. necessary for pressing the sheets of a laminated glass together, becomes converted, in part, into lower boiling components. Such a substance is not a solvent of high boiling point for the purpose of my present invention. Acetone also is not a solvent for these highly polymerized products.

The solvents of high boiling point contained in the adhesive impart to the latter the property of acting as slip means. The boiling point of the solvent should be situated as far as possible above 100° C., and it is obvious that the higher the boiling point the smaller is the amount of this solvent which can diffuse into the intermediate layer, and with adhesives employed according to this invention there will remain a sufficient excess to act as slip means and to pick up and expel the finest particles of air from the joint.

With an adhesive according to my invention, the procedure for the production of laminated glass and similar laminated products by means of highly molecular intermediate layers is that the adhesive is applied in excess amount to one component part of the structure (preferably to the interlayer), and the uniting operation then performed at a temperature of 60° to 90° C. and at such a pressure that the excess of adhesive is forced out of the joint as slip means. Preferably, however, the highly molecular intermediate layer is caused to swell by immersion in the adhesive, and the connection then made at the above mentioned temperature, and at such a pressure that the excess of adhesive which remains adhering to the immersed plate or foil is pressed out of the joint as slip means.

The following examples illustrate my invention;

1. 50 parts by weight of a polyvinyl acetate of low viscosity are mixed with 50 parts by weight of ethylene glycol mono-methyl ether (B. P. 125° C.) at approximately 42° C. to form a homogeneous mixture. An adhesive liquid is thereby produced which is viscous, but permits of the immersion therein of the intermediate layer (consisting of highly polymerised vinyl acetate). The time of such immersion ordinarily amounts to approximately 30 minutes. The so treated intermediate layer is then removed, placed between two carefully cleaned sheets of glass, and united with the sheets of glass under pressure at a temperature of 60° to 90° C. The excess of adhesive which remains adhering to the intermediate layer acts as sluggishly flowing slip means.

2. 30 parts by weight of polyvinyl acetate of medium viscosity, and 20 parts of polyacrylic acid ethyl ester of low viscosity, are thoroughly mixed with 50 parts of the acetate of ethylene glycol mono-methyl ether (B. P. 144.5° C.) till a homogeneous mixture is obtained. It is advisable to perform this operation at approximately 50° C. The resulting viscous adhesive possesses extremely high cementing powers and is used to secure a layer of highly polymerised vinyl acetate between two glass sheets as described in Example 1.

By the expression "laminated glass or the like" as used herein I mean bodies composed of sheets of glass with one or more intermediate strengthening layers, and also sheets of glass with a strengthening backing such as are used for reflecting signs.

By the expression "highly polymerised vinyl acetate or an acrylic acid ester" as used herein, I mean a polymerisation product which has a degree of polymerisation of between 600 and 680 (absolute viscosity 70 to 80). The polymerisation product of "low viscosity" has a degree of polymerisation of between 200 and 240 and the polymerisation product of "medium viscosity" has a degree of polymerisation between 320 and 380 (see Staudinger "Die hochmolekularen organischen Verbindungen (1932) pp. 41 to 45). The "medium viscosity" polymerized product has an absolute viscosity of 30 to 40. These "absolute viscosity" figures are measured by the method given by Mayer & Mark, in Der Aufbauder hochpolymeren organischen Naturstoff (1930) pages 175 to 177.

What I claim as new and desire to secure by Letters Patent is:

1. A laminated product including two sheets at least one of which is glass, and an interlayer sheet consisting of a polymer selected from the group consisting of polymerized vinyl acetate and polymerized acrylic acid ester, said polymer having a degree of polymerization between 600 and 680, an adhesive disposed between said first mentioned sheets and said interlayer sheet, said adhesive consisting of an organic solvent having a boiling point of not less than 100° C. and substantially free from solvents having boiling points below 100° C., and a polymerized unsaturated ester selected from the group consisting of vinyl acetate and acrylic acid ester, which latter polymerized body has a degree of polymerization between 200 and 380, the solvent representing 35% to 75% of the adhesive.

2. A laminated glass comprising two rigid sheets, at least one of which is glass, an interlayer of a resin which is a highly polymerized ester selected from the group consisting of vinyl acetate and acrylic acid ester, and having a degree of polymerization of between 600 and 680, and an adhesive between the first mentioned sheets and the said interlayer, said adhesive consisting of a polymerized ester selected from the group consisting of polymerized vinyl acetate and polymerized acrylic acid ester, and having a degree of polymerization between 200 and 380, and a high boiling organic solvent intimately mixed with said polymerized ester, said solvent having a boiling point above 100° C.

ADOLF KÄMPFER.